US 6,735,191 B1

(12) United States Patent
Hosein

(10) Patent No.: US 6,735,191 B1
(45) Date of Patent: May 11, 2004

(54) METHOD AND APPARATUS FOR TRANSPORTING TDM VOICE TRAFFIC OVER AN ATM NETWORK

(75) Inventor: Patrick A. Hosein, Monmouth, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/268,659

(22) Filed: Mar. 16, 1999

Related U.S. Application Data

(60) Provisional application No. 60/114,378, filed on Dec. 30, 1998.

(51) Int. Cl.⁷ ............................................... H04L 12/56
(52) U.S. Cl. .................... 370/352; 370/356; 370/395.1
(58) Field of Search .......................... 370/395.1, 395.2, 370/395.21, 395.43, 395.51, 395.6, 395.61, 395.64, 468, 352, 356, 532

(56) References Cited

U.S. PATENT DOCUMENTS

| | | | | |
|---|---|---|---|---|
| 5,463,620 A | * | 10/1995 | Sriram | 370/412 |
| 5,619,500 A | * | 4/1997 | Hiekali | 370/414 |
| 5,805,577 A | | 9/1998 | Jain et al. | |
| 5,831,970 A | * | 11/1998 | Arao | 370/227 |
| 5,889,773 A | | 3/1999 | Stevenson, III | |
| 5,909,443 A | * | 6/1999 | Fichou et al. | 370/412 |
| 5,946,323 A | | 8/1999 | Eakins et al. | |
| 5,982,748 A | | 11/1999 | Yin et al. | |
| 5,982,767 A | * | 11/1999 | McIntosh | 370/352 |
| 6,028,840 A | | 2/2000 | Worster | |
| 6,038,231 A | | 3/2000 | Dolby et al. | |
| 6,104,698 A | | 8/2000 | Fan et al. | |
| 6,108,336 A | | 8/2000 | Duault et al. | |
| 6,118,763 A | * | 9/2000 | Trumbull | 370/231 |
| 6,167,049 A | * | 12/2000 | Pei et al. | 370/395 |
| 6,169,735 B1 | | 1/2001 | Allen, Jr. et al. | |
| 6,215,768 B1 | | 4/2001 | Kim | |
| 6,222,824 B1 | * | 4/2001 | Marin et al. | 370/230 |
| 6,226,264 B1 | | 5/2001 | Shibata et al. | |
| 6,233,226 B1 | | 5/2001 | Gringeri et al. | |
| 6,252,857 B1 | * | 6/2001 | Fendick et al. | 370/254 |
| 6,331,981 B1 | | 12/2001 | Harth et al. | |
| 6,407,992 B1 | * | 6/2002 | Pasternak et al. | 370/338 |
| 6,411,946 B1 | | 6/2002 | Chaudhuri | |
| 6,442,138 B1 | | 8/2002 | Yin et al. | |
| 6,445,696 B1 | | 9/2002 | Foodeei et al. | |
| 6,453,351 B1 | | 9/2002 | Endo | |
| 6,477,167 B1 | | 11/2002 | Wu | |
| 6,480,511 B1 | * | 11/2002 | Petty | 370/509 |
| 6,490,248 B1 | * | 12/2002 | Shimojo | 370/229 |
| 6,504,845 B1 | | 1/2003 | Petersen et al. | |

OTHER PUBLICATIONS

Jeong, Seong–Ho et al "Cell Loss Ratio and Multiplexing Gain of an ATM Multiplexer for VBR Voice Sources" Local Computer Networks, Oct. 11–14, 1998, pp. 384–389.*

(List continued on next page.)

Primary Examiner—Chi Pham
Assistant Examiner—Anh-Vuh Ly

(57) ABSTRACT

A method and apparatus are provided to transport TDM voice traffic over an ATM network. A first plurality of TDM voice traffic circuits, such as T1 or E1 circuits, are multiplexed to create a first rt-VBR virtual circuit such that the bandwidth of the first rt-VBR virtual circuit is not limited. A second plurality of TDM voice traffic circuits are multiplexed to create a second rt-VBR virtual circuit such that the bandwidth of the second rt-VBR virtual circuit is not limited. This may be done by AAL2 multiplexing with substantially large SCR, PCR and MBS values. The first and second rt-VBR virtual circuits are combined for transport over a link in the ATM network. An overload and/or admission control process may be performed based on the ATM network link utilization. The TDM voice traffic AAL2 multiplexing uses silence suppression and may or may not use voice compression.

12 Claims, 3 Drawing Sheets

FIG. 2

OTHER PUBLICATIONS

Babu, T.V.J.G et al "Performance of a Priority–Based Dynamic Capacity Allocation Scheme for WATM Systems" Global Telecommunications Conference, Nov. 8–12, 1998, vol. 4, pp. 2234–2238.*

Wang, Wendong et al "Implementation of an ATM Network and PSTN/N–ISDN Interworking Gateway" Communication Technology Proceedings, Oct. 22–24, 1998, vol. 1, pp. 45–49.*

K. Sriram and Y.–T. Wang, "Voice Over ATM Using AAL2 and Bit Dropping: Performance and Call Admission Control," 1998 IEEE ATM Workshop (May 1998).

Kotikalapudi Sriram, R. Scott McKinney and Mostafa Hashem Serif, "Voice Packetization and Compression in Broadband ATM Networks," IEEE Journal on Selected Areas in Communications, vol. 9, No. 3, pp. 294304 (April 1991).

J.L. Marzo, J. Domingo–Pascual, R. Fabregat and J. Solé–Pareta, "Enhanced Convolution Approach for Connection Admission Control in ATM Networks," pp. 165–181.

Silvia Giordano, Jean–Yves Le Boudec, Philippe Oechslin and Stephan Robert, "VBR Over VBR: The Homogeneous, Loss–Free Case,".

John H. Baldwin, Behram H. Bharucha, Bharat T. Doshi, Subrahmanyam Dravida and Sanjiv Nanda, "AAL–2—A New ATM Adaptation Layer for Small Packet Encapsulation and Multiplexing," Bell Labs Technical Journal, pp. 111–131 (Spring 1997).

* cited by examiner

METHOD AND APPARATUS FOR TRANSPORTING TDM VOICE TRAFFIC OVER AN ATM NETWORK

CROSS REFERENCE TO RELATED APPLICATIONS

This application claims the benefit of U.S. Provisional Application No. 60/114,378 entitled "Method and Apparatus for Transporting TDM Voice Traffic Over an ATM Network," filed Dec. 30, 1998.

The present invention is related to U.S. Provisional Patent Application No. 60/114,394 entitled "Method and Apparatus for Transporting Private Line Traffic Over an ATM Network" to Patrick A. Hosein and Gagan L. Choudhury; U.S. Provisional Patent Application No. 60/114,459 entitled "Method and Apparatus for Removal of Dataless Frames When Transporting Private Line Traffic Over an ATM Network" to Patrick A. Hosein; and U.S. Provisional Patent Application No. 60/114,458 entitled "Method and Apparatus for Overload and Admission Controls Using the AAL2 Adaptation Layer for TDM Voice and Private Line Traffic" to Patrick A. Hosein, all filed Dec. 30, 1998 and the entire disclosures of which are hereby incorporated by reference.

FIELD OF THE INVENTION

The present invention relates to communication networks. More particularly, the present invention relates to a method and apparatus for transporting TDM voice traffic over an ATM network.

BACKGROUND OF THE INVENTION

Voice traffic has traditionally been transported using a Synchronous Transfer Mode to (STM) network. A network using Time Division Multiplexing (TDM) to combine 64 kilobit per second (kbit/s) Digital Signal 0 (DS0) channels is one example of an STM network. Using TDM, each channel of voice traffic is assigned a specific time period, or TDM channel, configured to let the channel carry a desired maximum amount of voice information. In this way, the STM network provides a high Quality of Service (QOS) because each TDM channel, by design, can handle the maximum amount of voice information. As a result, voice information is generally not lost or delayed. However, since silence periods are still transmitted bandwidth is not used efficiently.

It is also known that voice traffic can be transported via an Asynchronous Transfer Mode (ATM) network. An ATM network uses dedicated-connection switching technology that organizes digital data into 53-byte cells and transmits them over a medium using digital signal technology. Individually, a cell is processed asynchronously relative to other related cells and may be queued before being multiplexed with other cells, from other channels, over a single line, or "link." Because ATM networks are more easily implemented by hardware (rather than software), faster processing speeds are possible. In addition, ATM networks allow for more efficient bandwidth use because different services, such as voice and data, can be statistically multiplexed over the same link.

Generally, 24 DS0 voice traffic channels are combined using TDM into a single domestic T1 circuit, or 30 DS0 channels are combined into a single international E1 circuit. A number of these T1 circuits (or E1 circuits) are then combined using an ATM Adaptation Layer (AAL) to create a virtual circuit. An AAL adaptation layer merely packages higher layer information, such as the T1 or E1 circuit information, into the contents of the 53-byte ATM cell. A number of these virtual circuits are then combined for transport over an ATM network link, such as over a single ATM network "pipe."

To maintain the high quality traditionally associated with STM networks, the AAL1 adaptation layer is used together with Constant Bit Rate (CBR) service (together known as "circuit emulation"). As with TDM, the CBR circuit emulation approach provides a constant guaranteed rate of transfer. That is, a CBR connection allocates enough bandwidth to each channel to support a desired maximum rate of information. In this way, CBR circuit emulation provides a QOS similar to that of an STM network, but does not provide any statistical multiplexing benefits since cells are still used to transport silent periods during a conversation.

To better utilize the bandwidth of an ATM network link, a "type 2" AAL (AAL2) adaptation layer can remove silence periods in voice traffic, known as "silence suppression," and also allows for voice compression. The AAL2 adaption layer can be used, for example, together with a Variable Bit Rate (VBR) virtual circuit. A VBR connection is one over which the rate of transmission can vary. Information is generally sent at a nominal rate of transmission, or Sustainable Cell Rate (SCR), but the rate can exceed this standard by "bursting" up to a peak rate, or Peak Cell Rate (PCR). The peak rate can only, however, be momentarily exceeded, as defined by the Maximum Burst Size (MBS). A real-time VBR (rt-VBR) connection is typically used when each end of the connection is required to maintain a timing relationship.

Using AAL2 together with a rt-VBR connection, it is possible to achieve significant statistical multiplexing gains when combining multiple voice channels onto a single virtual circuit. For each rt-VBR virtual circuit, SCR, PCR and MBS values are selected to achieve an acceptable delay objective. If the combined sources violate these parameters, cells may be dropped—resulting in reduced voice traffic quality. Also, cell queuing may take place, which also reduces the quality of voice traffic. In other words, the bandwidth of the rt-VBR virtual circuit is chosen to be less than the maximum bandwidth needed (i.e., the bandwidth needed if all voice channels delivered voice traffic with no silence periods). Therefore, the actual total load can sometimes exceed the virtual circuit bandwidth. This may lead to the loss of ATM cells or an increase in the delay experienced by ATM cells, either of which can reduce the quality of voice traffic.

Moreover, the network must monitor, or "police," each rt-VBR virtual circuit to ensure that the traffic does not exceed the allocated SCR, PCR and MBS values. In addition, when a rt-VBR virtual circuit exceeds these values, complex overload control and/or call admission control techniques may be needed to correct the situation and prevent the virtual circuit from adversely impacting the rest of the voice traffic carried over the ATM pipe.

In view of the foregoing, it can be appreciated that a substantial need exists for a method and apparatus to transport TDM voice traffic over an ATM network that allows for statistical multiplexing benefits while providing high quality voice service and solving the other problems discussed above.

SUMMARY OF THE INVENTION

The disadvantages of the art are alleviated to a great extent by a method and apparatus for transporting TDM voice traffic over an ATM network. A first plurality of TDM voice traffic circuits, such as T1 or E1 circuits, are multiplexed to create a first rt-VBR virtual circuit such that the bandwidth of the first rt-VBR virtual circuit is not limited. A second plurality of TDM voice traffic circuits are multiplexed to create a second rt-VBR virtual circuit such that the bandwidth of the second rt-VBR virtual circuit is not limited. This may be done by AAL2 multiplexing with substantially large SCR, PCR and MBS values. The first and second rt-VBR virtual circuits are combined for transport over a link in the ATM network. An overload and/or admission control process may be performed based on the ATM network link utilization. The TDM voice traffic AAL2 multiplexing uses silence suppression and may or may not use voice compression.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
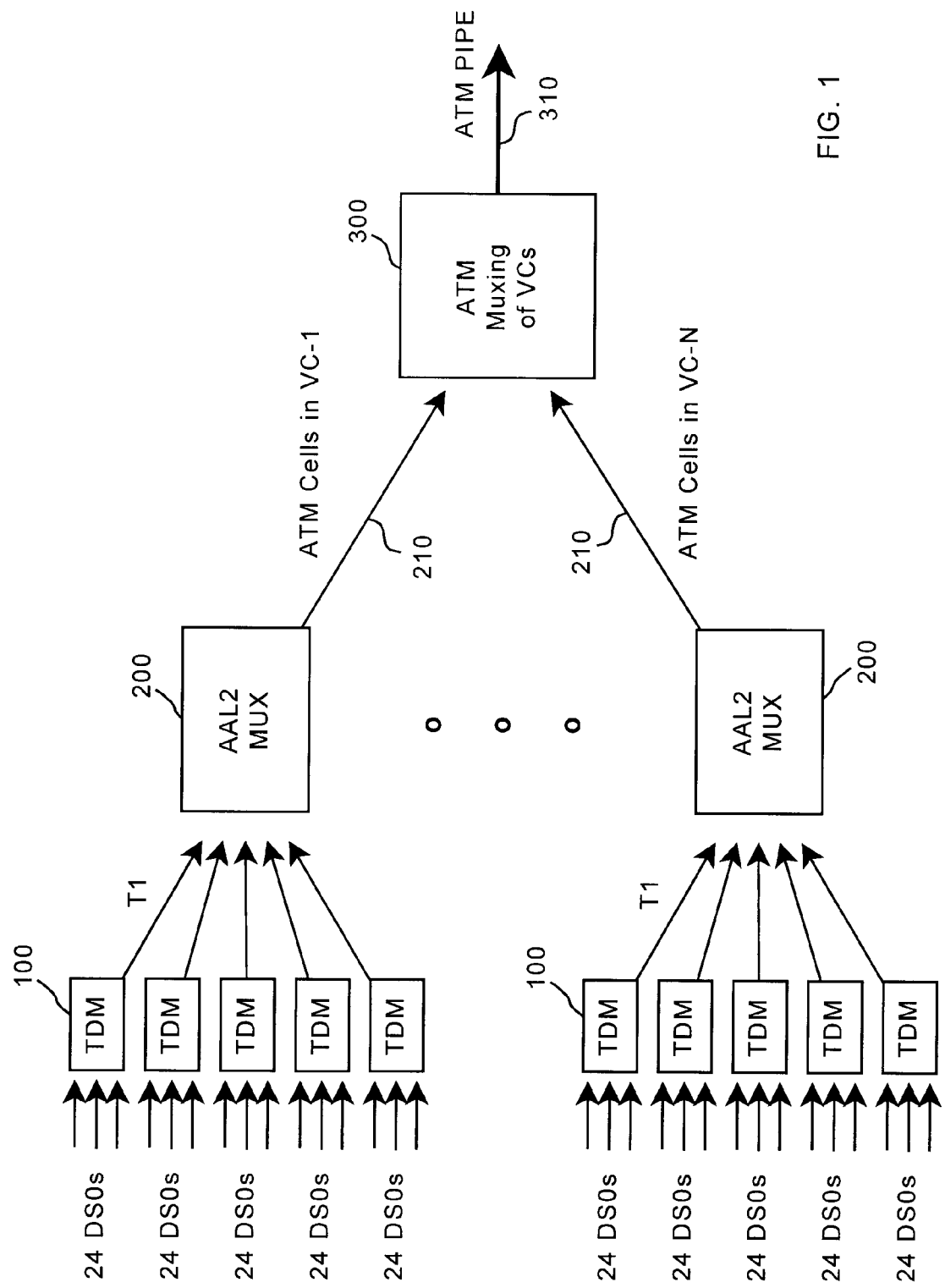
FIG. 1 is a block diagram of a network that transports voice traffic over an ATM link according to an embodiment of the present invention.

The present invention is directed to a method and apparatus for transporting TDM voice traffic over an ATM network with high efficiency and quality. Referring now in detail to the drawings wherein like parts are designated by like reference numerals throughout, there is illustrated in FIG. 1 a block diagram of a network that transports voice traffic over an ATM link according to an embodiment of the present invention. A number of voice traffic channels, such as 24 DS0 channels, are combined at a TDM unit 100 into a single T1 circuit. Although an embodiment of the present invention is illustrated using a T1 circuit, it will be appreciated that other types of circuits, such as an international E1 circuit, may be used instead.

A number of T1 circuits are combined at an AAL2 adaptation layer unit 200 to create a virtual circuit 210. For example, as shown in FIG. 1, five T1 circuits, representing 120 DS0 voice traffic channels, can be AAL2 multiplexed into a single rt-VBR virtual circuit 210. A number (N) of these rt-VBR virtual circuits 210 are then combined at an ATM multiplexing unit 300 for transport over an ATM network pipe 310 or link.

According to an embodiment of the present invention, the bandwidth of each rt-VBR virtual circuit 210 is not limited. In other words, SCR, PCR and MBS values for each rt-VBR virtual circuit 210 can be selected such that each virtual circuit 210 can use any bandwidth available at the ATM network pipe 310.

The SCR, PCR and MBS values for each rt-VBR virtual circuit 210 may be selected to guarantee that individual rt-VBR virtual circuits 210 have this "unlimited" bandwidth. That is, the SCR, PCR and MBS values can be made large enough so that cells are rarely discarded for violating these parameters. These parameters can be set once to very large, or even maximum, values and may not need to be re-determined as the system changes, simplifying the provisioning process.

As shown in FIG. 1, 120 voice traffic channels (DS0s) can be multiplexed into a single rt-VBR virtual circuit 210. A number of rt-VBR virtual circuits 210, such as VC-1 to VC-N, may be required for a high speed ATM pipe 310 because the AAL2 standard allows for a maximum of 248 traffic sources per virtual circuit.

The number of voice circuits that can be supported on the ATM pipe 310 may be determined as follows. Assuming that only voice circuits are carried over the ATM pipe 310, a Cell Loss Ratio (CLR) can be chosen based on the desired voice quality. Assuming no buffers, the maximum number of voice circuits can then be computed so as to provide the desired CLR. Note that this is a conservative approach, because if the total load temporarily exceeds the ATM pipe 310 capacity, buffering reduce the number of cells that are actually discarded. Since the characteristics of the load may change over time, the system may be monitored, in real time, to ensure that the desired CLR is not exceeded.

Figure 2:
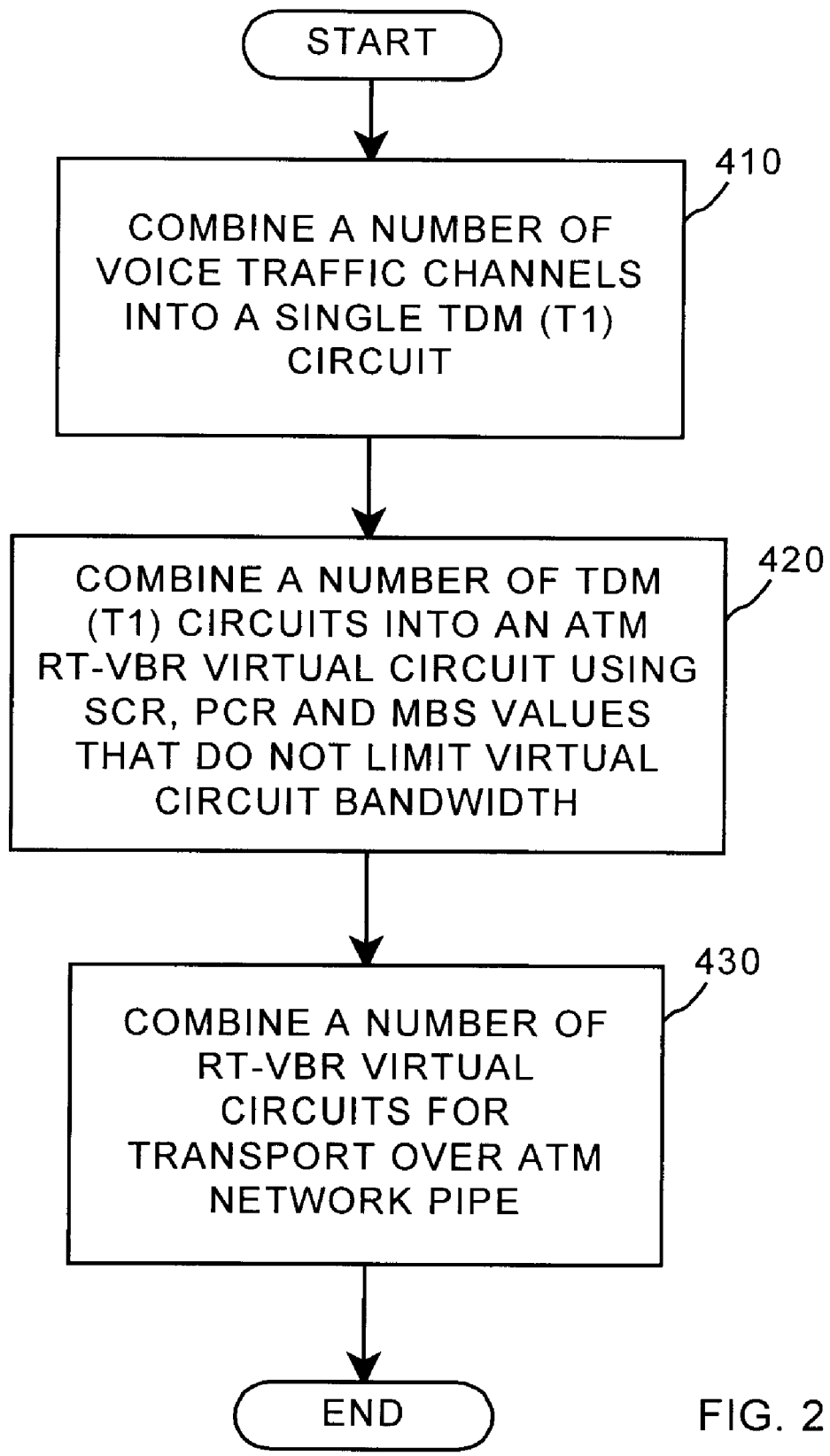
FIG. 2 is a flow diagram of a method for transporting voice traffic over an ATM network according to an embodiment of the present invention.

FIG. 2 is a flow diagram of a method for transporting voice traffic over an ATM network according to an embodiment of the present invention. At step 410, a number of voice traffic channels, such as 24 DS0 channels, are combined at a TDM unit into a single T1 circuit. At step 420, a number of these T1 circuits are combined at an AAL2 adaptation layer unit to create a rt-VBR virtual circuit using SCR, PCR and MBS values that do not restrict the bandwidth of the rt-VBR virtual circuit, such as substantially large SCR, PCR and MBS values. Finally, a number of these rt-VBR virtual circuits 210 are combined at an ATM multiplexing unit for transport over an ATM network pipe at step 430.

Because several of these "unlimited" bandwidth rt-VBR virtual circuits are multiplexed onto the ATM pipe 310, statistical multiplexing is achieved at the link level as well as at the AAL2 level.

In addition, ATM cells will be rarely queued or dropped, resulting in voice quality similar to that obtained using a STM network or ATM circuit emulation. According to an embodiment of the present invention, only silence compression, and not voice compression, is implemented at the AAL2 multiplexing unit. This is because voice compression may have already taken place, such as is the case with a wireless voice source, and further compression at the AAL2 multiplexing unit may lead to reduced voice quality.

Moreover, because ATM cells are not queued, the rt-VBR virtual circuit buffers will not overflow. Thus, there is no need to invoke any overload control or call admission control based on individual rt-VBR virtual circuits, simplifying congestion management for the system. In other words, each rt-VBR virtual circuit does not need to be policed to ensure that traffic does not exceed the allocated SCR, PCR and MBS values (which can be set to vary large values).

Figure 3:
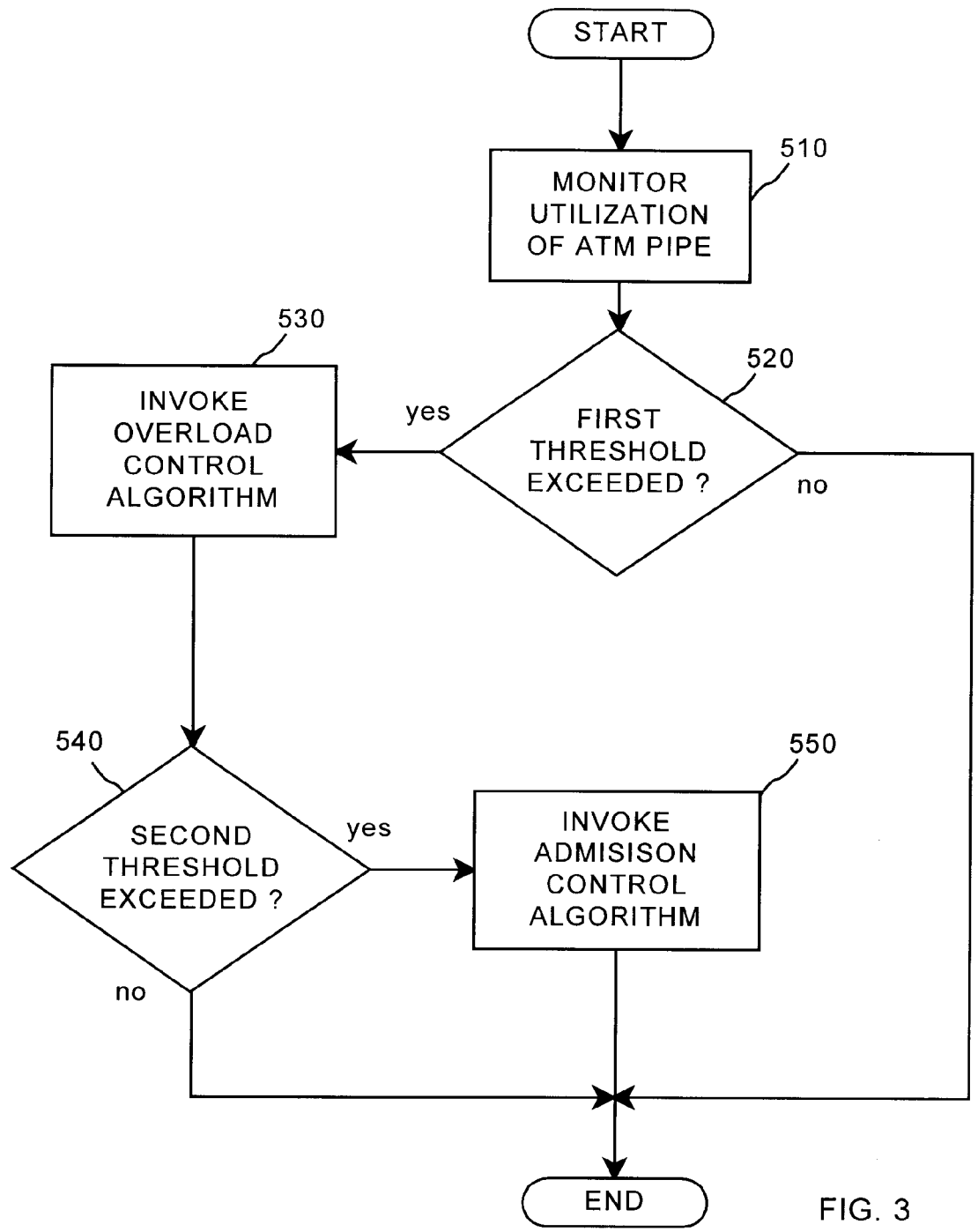
FIG. 3 is a flow diagram of a method for providing overload and admission controls when transporting voice traffic over an ATM network according to an embodiment of the present invention.

FIG. 3 is a flow diagram of a method for providing overload and admission controls when transporting voice traffic over an ATM network according to an embodiment of the present invention. Details of a suitable method are also disclosed in U.S. Provisional Patent Application No. 60/114,458 entitled "Method and Apparatus for Overload and Admission Controls Using the AAL2 Adaptation Layer for TDM Voice and Private Line Traffic".

Since no overload controls or call admission controls are applied at the rt-VBR virtual circuit level, there will be times when the ATM pipe capacity is not sufficient to serve the offered load. At these times, overload controls and/or call admission controls will be needed. These controls can be applied to all rt-VBR virtual circuits, at all AAL2 multiplexing units, as follows.

At step 510, the level of traffic, or "utilization," of the ATM pipe 310 is monitored. When a first threshold utilization value is exceeded at 520, an overload control algorithm is invoked at 530. If desired, a call admission control algorithm can be invoked at 550 when a second (higher) threshold utilization value is detected at 540.

There can be significant advantages to invoking these controls on an ATM pipe basis as opposed to an rt-VBR virtual circuit basis. If controls are done on a virtual circuit basis, the overload and call admission controls are invoked whenever the load on a single virtual circuit bursts. In contrast, when controls are done on a ATM pipe basis they will only be invoked when the overall load exceeds a threshold value. This implies that a burst caused by a single virtual circuit is easily accommodated by using unused bandwidth from other virtual circuits. Another advantage is the fact that, because overload control is invoked at all virtual circuits simultaneously, a quick relief from the overload is possible. Similarly, call admission controls can be applied on all virtual circuits simultaneously. Finally, the overall link utilization information can be used to determine if the link needs to be re-engineered, such as by adding or deleting circuits.

Although various embodiments are specifically illustrated and described herein, it will be appreciated that modifications and variations of the present invention are covered by the above teachings and within the purview of the appended claims without departing from the spirit and intended scope of the invention. For example, although particular system architectures were used to illustrate the present invention, it can be appreciated that other architectures may be used instead. Similarly, although particular types of links and channels have been illustrated, other types of links and channels will also fall within the scope of the invention.

Finally, although software or hardware are described to control certain functions, such functions can be performed using either software, hardware or a combination of software and hardware, as is well known in the art. As is also known, software may be stored on a medium, such as, for example, a hard or floppy disk or a Compact Disk Read Only Memory (CD-ROM), in the form of instructions adapted to be executed by a processor. The instructions may be stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

What is claimed is:

1. A method for transporting Time Division Multiplexing (TDM) voice traffic in packet form, comprising multiplexing individual pluralities of TDM voice traffic circuits into respective real time variable bit rate (rt-VBR) virtual circuits, each rt-VBR virtual circuit having a sustainable cell rate, peak cell rate and maximum burst size, and combining the rt-VBR virtual circuits for transport over a packet network link, said packet network link implementing at least one of a packet overload control mechanism and a packet admission control algorithm, the combination of a) said sustainable cell rate, b) said peak cell rate, c) said maximum burst size, d) the bit rate of the TDM voice traffic circuits, e) the number of multiplexed TDM voice traffic circuits, f) the number of said rt-VBR circuits, g) the capacity of said packet network link and h) a predefined cell loss ratio for said packet network link, being such that substantially all overload control and substantially all admission control of said packets is performed at said packet network link and substantially no overload control and substantially no admission control of said packets is performed at any of said rt-VBR virtual circuits.

2. The invention of claim 1 wherein said sustainable cell rate, peak cell rate and maximum burst size are substantially at their maximum values for all of said rt-VBR virtual circuits.

3. The invention of claim 2 further comprising monitoring the utilization of the packet network link;

invoking said packet overload control algorithm when the packet network link utilization exceeds a first threshold value, and invoking said packet admission control algorithm when the packet network link utilization exceeds a second threshold value.

4. The invention of claim 2 wherein said packet network is an ATM network and said packet network link is an ATM network link.

5. The invention of claim 4 wherein said multiplexing uses ATM Adaptation Layer type 2 (AAL2) multiplexing.

6. The invention of claim 2 further comprising performing silence suppression on said TDM voice traffic circuits prior to said multiplexing.

7. Apparatus for transporting Time Division Multiplexing (TDM) voice traffic in packet form, comprising means for multiplexing individual pluralities of TDM voice traffic circuits into respective real time variable bit rate (rt-VBR) virtual circuits, each rt-VBR virtual circuit having a sustainable cell rate, peak cell rate and maximum burst size, and means for combining the rt-VBR virtual circuits for transport over a packet network link, said packet network link implementing at least one of a packet overload control mechanism and a packet admission control algorithm, the combination of a) said sustainable cell rate, b) said peak cell rate, c) said maximum burst size, d) the bit rate of the TDM voice traffic circuits, e) the number of multiplexed TDM voice traffic circuits, f) the number of said rt-VBR circuits, g) the capacity of said packet network link and h) a predefined cell loss ratio for said packet network link, being such that substantially all overload control and substantially all admission control of said packets is performed at said packet network link and substantially no overload control and substantially no admission control of said packets is performed at any of said rt-VBR virtual circuits.

8. The invention of claim 7 wherein said sustainable cell rate, peak cell rate and maximum burst size are substantially at their maximum values for all of said rt-VBR virtual circuits.

9. The invention of claim 8 wherein said packet network is an ATM network and said packet network link is an ATM network link.

10. The invention of claim 9 further comprising means for monitoring the utilization of the ATM link, for invoking said packet overload control algorithm when the ATM link utilization exceeds a first threshold value, and for invoking said packet admission control algorithm when the ATM link utilization exceeds a second threshold value.

11. The invention of claim 10 wherein said multiplexing uses ATM Adaptation Layer type 2 (AAL2) multiplexing.

12. The invention of claim 10 further comprising performing silence suppression on said TDM voice traffic circuits prior to said multiplexing.

* * * * *